United States Patent [19]
Turk et al.

[11] Patent Number: 5,850,192
[45] Date of Patent: Dec. 15, 1998

[54] APPARATUS FOR SENSING VEHICLES

[75] Inventors: Frederick J. Turk, St. Paul; Claude E. Cybulski, Lake Elmo; Earl B. Hoekman, Roseville, all of Minn.

[73] Assignee: Minnesota Mining and Manufacturing Company, St. Paul, Minn.

[21] Appl. No.: 777,298

[22] Filed: Dec. 27, 1996

[51] Int. Cl.⁶ .................................................. G08G 1/01
[52] U.S. Cl. .......................... 340/933; 340/666; 340/939; 340/941; 200/86 A; 701/117; 701/118; 701/119; 174/95; 174/100; 174/101
[58] Field of Search ..................... 340/941, 933, 340/935, 936, 939, 596, 665, 666; 200/85 R, 86 A, 86 R; 73/866.5; 324/236, 238, 244, 654, 655; 364/436, 438, 565; 248/220.21, 221.11, 310, 50, 304, 305, 200.1, 201; 404/71, 73

[56] References Cited

U.S. PATENT DOCUMENTS

| | | | |
|---|---|---|---|
| 3,249,915 | 5/1966 | Koerner | 340/941 |
| 3,649,958 | 3/1972 | Koerner | 340/941 |
| 3,714,626 | 1/1973 | Koerner | 340/941 |
| 3,775,742 | 11/1973 | Koerner et al. | 340/941 |
| 3,943,339 | 3/1976 | Koerner et al. | 340/941 |
| 3,984,764 | 10/1976 | Koerner | 340/941 |
| 4,032,096 | 6/1977 | Perrault et al. | 248/70 |
| 4,449,115 | 5/1984 | Koerner | 340/941 |
| 4,839,480 | 6/1989 | Bickley | 200/86 A |
| 4,939,512 | 7/1990 | Dennison et al. | 340/941 |
| 4,943,805 | 7/1990 | Dennison | 340/941 |
| 5,265,481 | 11/1993 | Sonderegger et al. | 340/933 |
| 5,442,136 | 8/1995 | Allen | 174/95 |
| 5,486,820 | 1/1996 | Chatigny et al. | 340/933 |
| 5,491,475 | 2/1996 | Rouse et al. | 340/941 |
| 5,520,056 | 5/1996 | Buisson et al. | 340/933 |

FOREIGN PATENT DOCUMENTS

2437797 A  2/1976  United Kingdom .

OTHER PUBLICATIONS

Copy of International Search Report dated Sep. 24, 1997.

*Primary Examiner*—Nina Tong
*Attorney, Agent, or Firm*—Kari H. Bartingale; Peter L. Olson

[57] ABSTRACT

An underground vehicle sensing system extends below a vehicle travel surface to detect the presence of a vehicle. A conduit extends substantially horizontally underground from an access hole placed at the side of the vehicle travel surface. A plurality of sensors are spaced apart in the conduit to detect localized changes in the magnetic field. A plurality of sections house the probes and wiring to orient and position the probes. Sections detachably clip together to form a lightweight support structure and may be added one by one through the access hole. Lightweight extension members are utilized in some configurations between the support sections for positioning and supporting the probes.

19 Claims, 6 Drawing Sheets

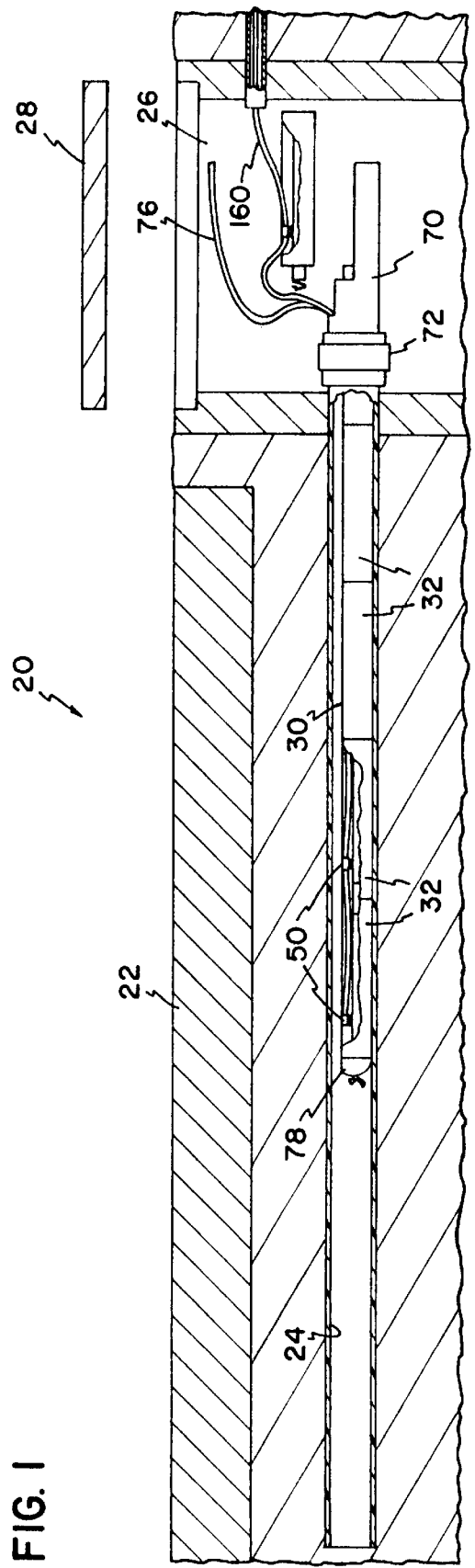
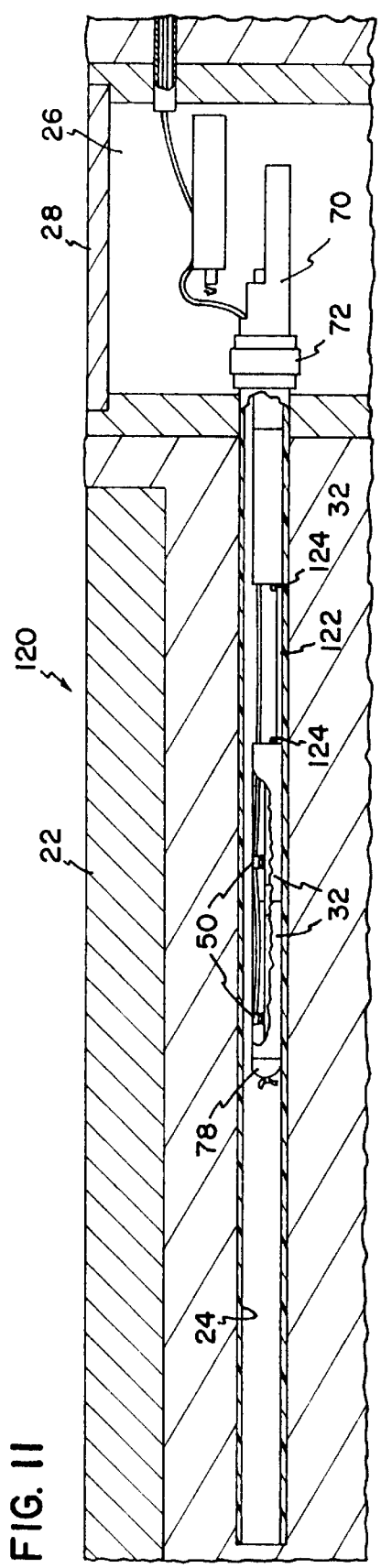
FIG. I
FIG. II

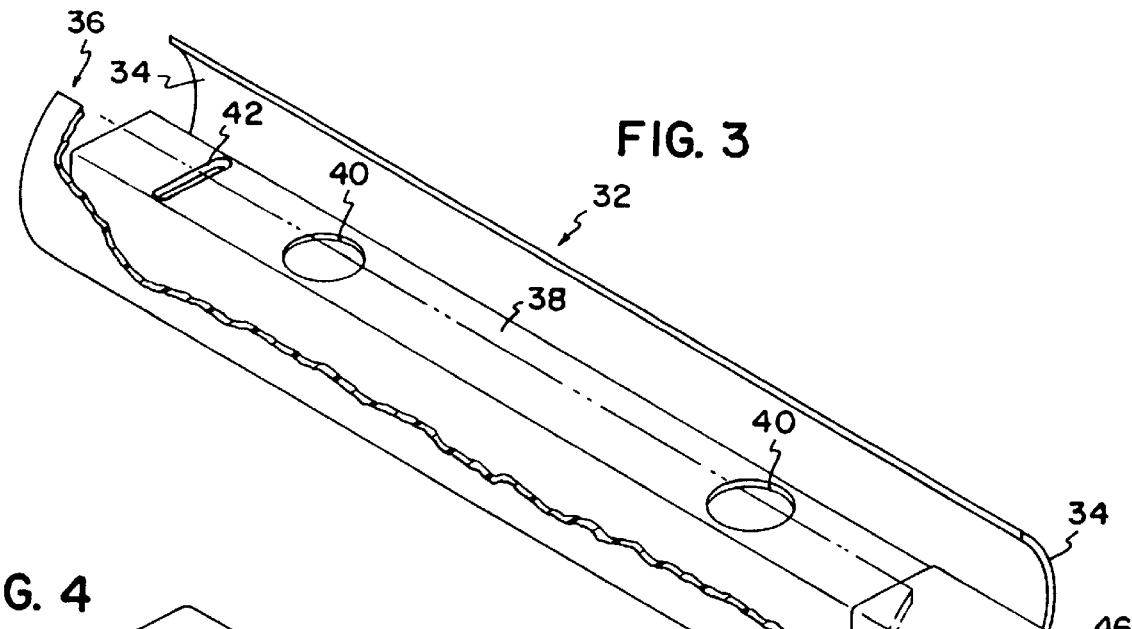
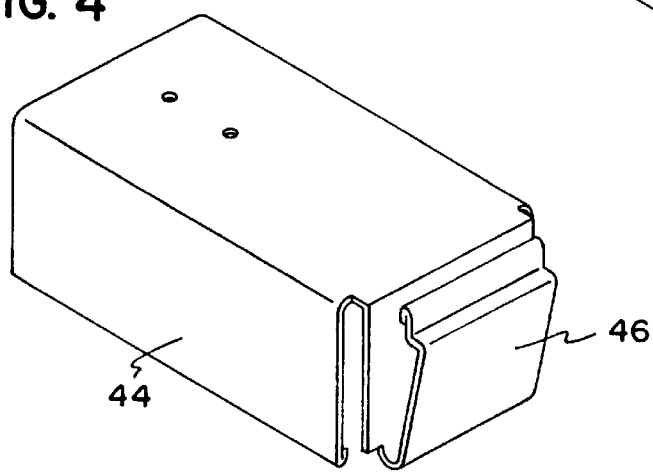
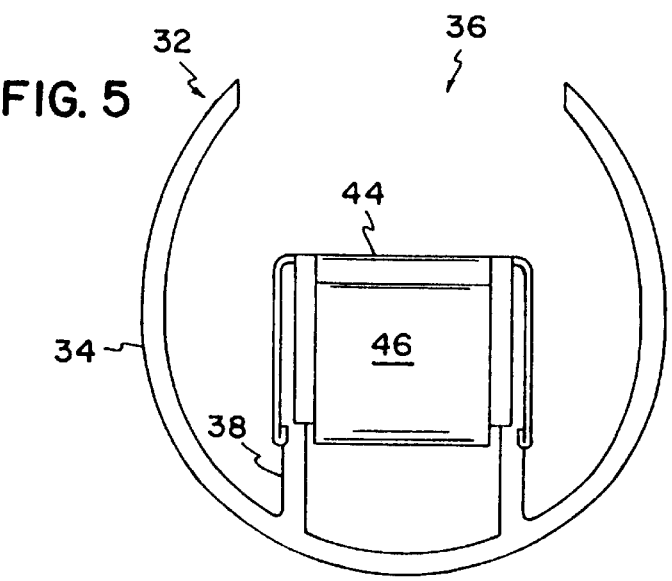

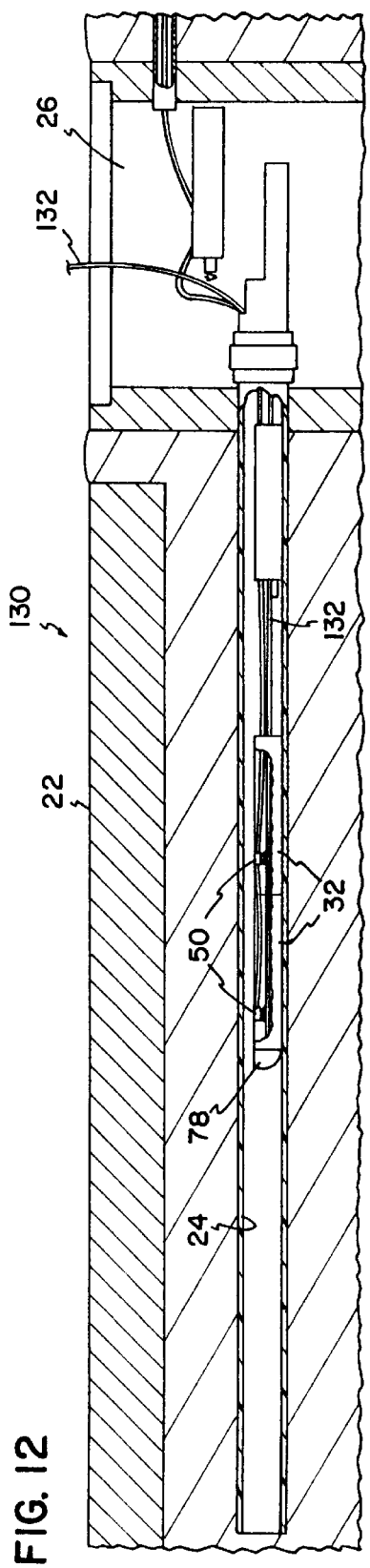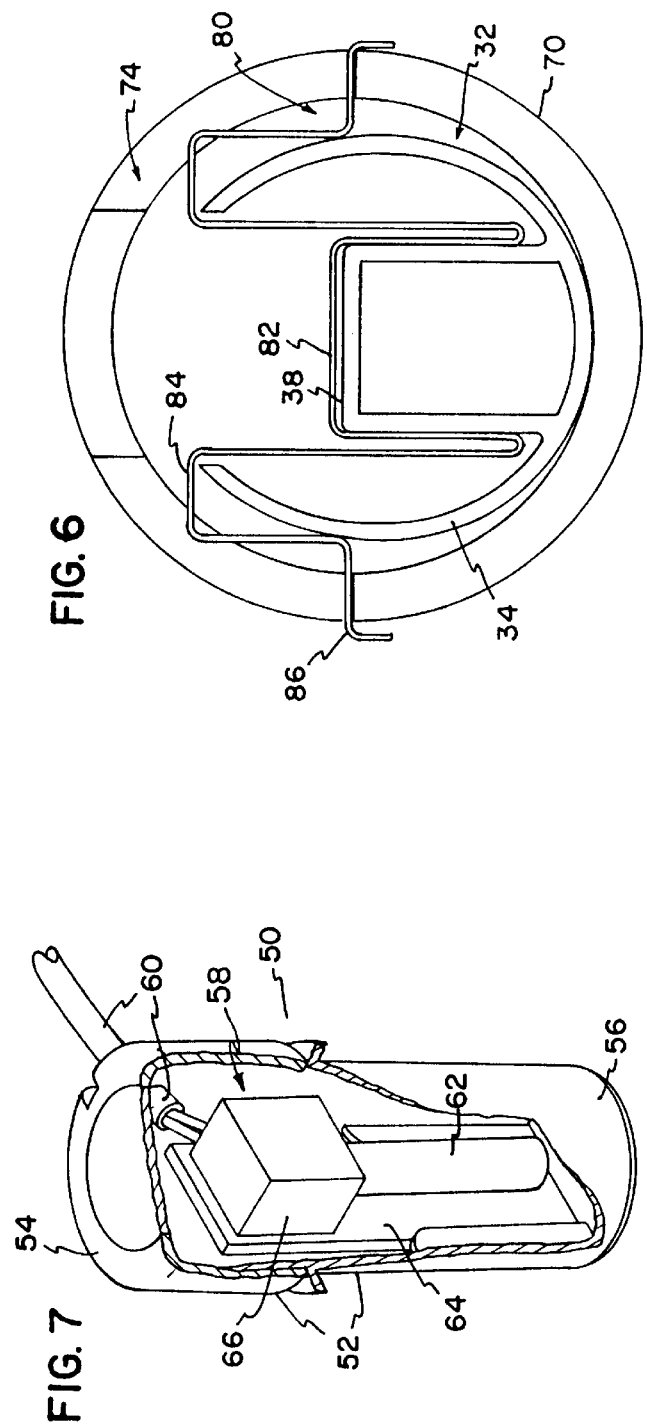

APPARATUS FOR SENSING VEHICLES

BACKGROUND OF THE INVENTION

1. Field of the Invention

The present invention is directed to an underground apparatus and method for sensing vehicles and to a method for installing the apparatus.

2. Prior Art

Methods and devices for detecting the presence of vehicles on a street or road are well known. Detecting the presence of a vehicle is done for a variety of reasons. Vehicles may be detected to monitor the traffic flow and determine road usage. This information may be utilized for transportation planning and traffic light control. Pairs of the sensing devices may also be utilized to monitor vehicle speeds.

When installed after the road has been constructed, prior art vehicle detection devices generally require boring through the pavement and cutting the surface of the pavement, thereby interrupting traffic flow for extended periods of time. This work creates substantial delays and inconveniences for drivers. A system that detects the change in presence of a vehicle that utilizes inductive loops six feet in diameter or larger is shown in U.S. Pat. No. 3,984,764. The '764 patent shows the prior art wherein complex loops require a substantially rectangular cut in the surface of the pavement to accommodate the multiple turn wire loops. A system that utilizes repeated loops for multiple sensors is shown in U.S. Pat. No. 3,943,399. Separate rectangular cuts must be made into the pavement for each sensor loop. The deeper the loops are buried in the pavement, the more turns of wire that are required to achieve a desired sensitivity for the system. In addition, these systems require a cut to the edge of the pavement to accommodate wiring leading to the system controller.

A system that detects the presence of a vehicle by a change in resistance is shown in U.S. Pat. No. 5,491,475. The '475 patent requires that the conduit is installed when building the roadway or that a wide slot is made through the surface following road creation. Further, an access box must be installed at each side of the roadway to provide access to the conduit for installing the sensors through the conduit and for wiring the system. Installation of this detection system may require cutting through the reinforcing bars used in concrete roadway construction which further complicates the installation. In addition, the accuracy of the change in resistance may be adversely affected by magnetism in the reinforcing grid and reduction in the earth's magnetic field concentration by the grid.

Another device shown in U.S. Pat. No. 4,449,115, requires a bore drilled through the pavement with sensing devices inserted into the bore to sense the change in impedance when a vehicle is present. These devices typically also require cutting a slot in the pavement surface for wiring from the sensor to the side of the pavement. Although this system provides an accurate sensing system, it is also destructive to the pavement and requires extended lane closures for installation and repair.

Cuts made in the pavement surface allow water to seep into cracks so that expansion and contraction from freeze and thaw cycles cause the road to deteriorate faster. Pavement expansion and contraction may also damage the vehicle detection system wiring, requiring repair and/or replacement. Sealing compounds to fill the cuts often attack asphalt and accelerate deterioration and seepage.

It can be seen then, that a new and improved underground system for detecting vehicles is needed. Such a system should accurately and precisely detect all vehicles passing over a predetermined location. Such a system should eliminate cutting the pavement surface to decrease the number and length of time for lane closures. Such a system should insert below the pavement through a single access point. Such a system should provide for easy and accurate placement and alignment of sensor probes which are placed below the pavement, rather than through or into the pavement. Underground installations are desirable as they cannot be run into by vehicles, are less affected and have lower rates of change due to temperature changes, and are not affected by common pavement restoration methods or maintenance equipment such as plows or street cleaners. The probe support structure should be separable into a plurality of sections for angular alignment, easy insertion and removal. The present invention addresses these, as well as other problems associated with underground vehicle sensing systems.

SUMMARY OF THE INVENTION

The present invention relates to an underground vehicle sensing system, and in particular to a vehicle sensing system which is placed beneath a vehicle travel surface, typically pavement. A vehicle passing over the pavement causes a change in impedance in one or more of a plurality of probes placed beneath the pavement. The probes must be fixed in orientation and stable to reliably detect the presence of a vehicle.

The sensor probes are placed in an extended support structure which extends below the surface of the pavement from one side of the pavement. A surface access hole or hand hole connects with the structure and allows for insertion of the support structure and array of sensors. The support structure typically includes a plurality of support sections which clip together to form the extended structure. The system may also utilize members or other connecting material that does not support probes to connect probe supporting sections. These non-supporting sections may be made from a shaft or other structure that maintains relative distance and rotational alignment between supporting sections. In a first embodiment, each support section is connected in an end-to-end manner with a clip that provides for retaining adjacent sections and preventing relative angular displacement. The sections may be substantially rounded to be self-centering and be weighted to maintain the probes in a substantially vertically oriented position. The present invention may use various wiring configurations extending through the sections and connecting the probes to a processor or other controller, placed either at the side of the road or in a remote location. Each probe supporting section includes a frame portion with mounting holes placed therein which receive the sensor probes. The sections fit within the orifice or conduit extending substantially parallel to the pavement surface, typically at a depth of 16 to 24 inches below the surface.

Assembly of the system is easily performed as a first section is placed into the surface access hole with a sensor probe mounted therein. The first section may include a rounded nose portion and a retrieval line to assist in pulling the structure out, should removal for maintenance or repair be required. Once the sensor probe is in place, the first section may be slid along the conduit until there is sufficient room in the hand hole for the next section. The second section is then inserted and clipped onto the first section, with this step being repeated for a predetermined spacing.

Probes are mounted in predetermined sections to achieve the desired detection coverage area. This process is repeated until an extended structure is assembled with the sections aligned in an end-to-end configuration with the sensor probes positioned along the structure. When sufficient sections have been inserted to place the sensors in their desired pre-determined positions, the last section is clipped in place at the surface access hole so that the sensor probes are retained at their correct spacing and substantially vertical orientation.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views:

FIG. 1 shows a partially broken away side sectional view of a first embodiment of a vehicle sensing system according to the principles of the present invention;

FIG. 3 shows a partially broken away perspective view of a first embodiment of a probe carrier support section for the vehicle sensing system shown in FIG. 1;

FIG. 4 shows a perspective view of a connector clip for the support section shown in FIG. 3;

FIG. 5 shows an end perspective view of the support section shown in FIG. 3;

FIG. 6 shows an end perspective view of the a support section shown in FIG. 3 and the cradle for the vehicle sensing system shown in FIG. 1;

FIG. 7 shows a partially broken away perspective view of a sensor probe and housing for the vehicle sensing system shown in FIG. 1;

FIG. 11 shows a partially broken away side sectional of a second embodiment of a vehicle sensing system according to the principles of the present invention; and, FIG. 12 shows a partially broken away side sectional of a third embodiment of a vehicle sensing system according to the principles of the present invention.

DETAILED DESCRIPTION OF THE PREFERRED EMBODIMENT

Figure 2:
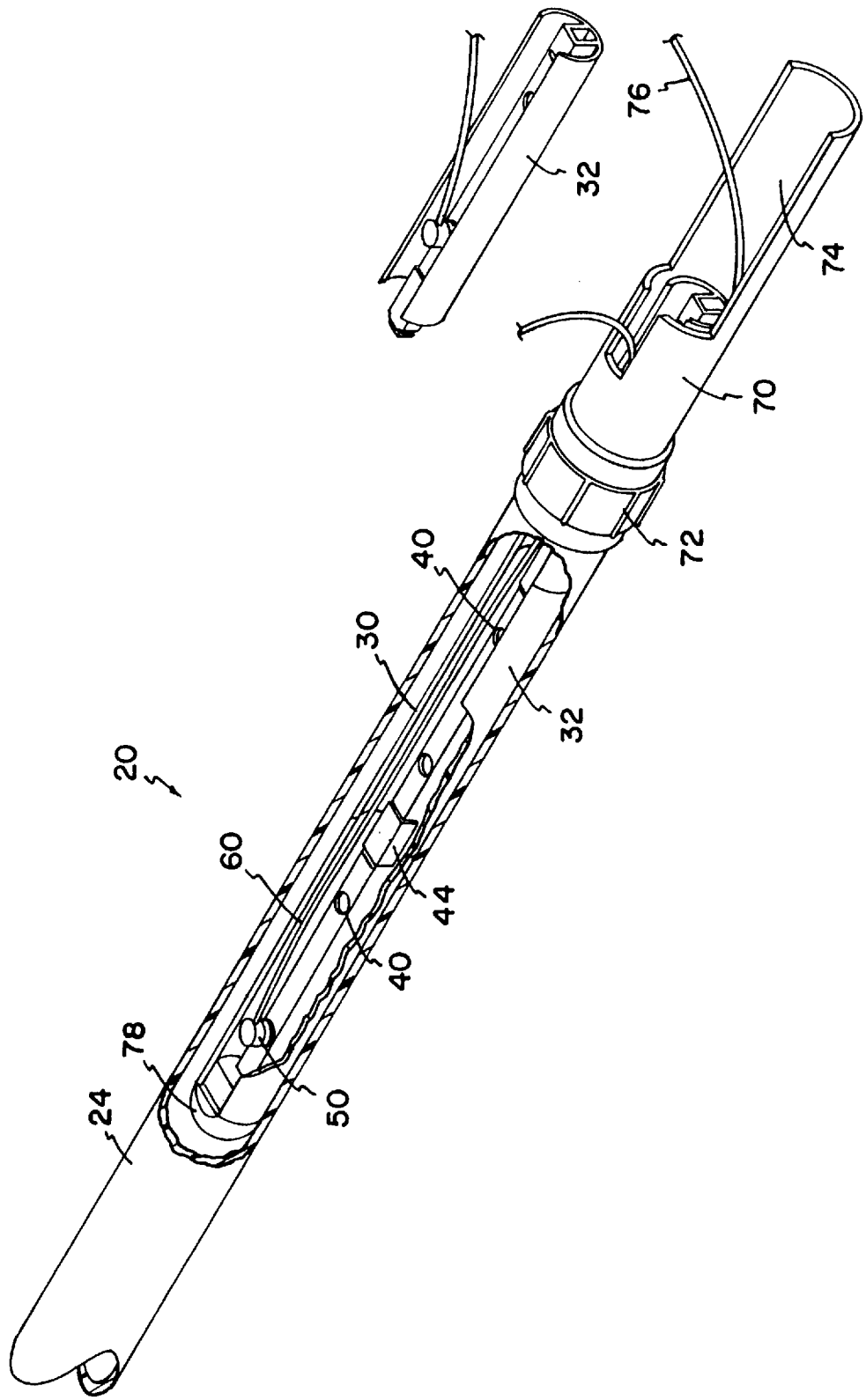
FIG. 2 shows a partially broken away perspective view of a portion of the vehicle sensing system shown in FIG. 1.

Referring now to the drawings, and in particular to FIG. 1, there is shown a below ground vehicle sensing system, generally designated 20. The vehicle sensing system 20 generally is positioned below a vehicle travel surface 22, normally pavement such as concrete or asphalt, and typically at a depth of 16 to 24 inches below the upper surface of the vehicle travel surface 22. In a preferred embodiment, a bore or conduit 24 extends horizontally under the vehicle 22 from a surface access hole 26, commonly referred to as a hand hole, at the side of the vehicle travel surface 22. The surface access hole 26 typically includes a cover 28 to protect the wiring, electronics and other elements of the vehicle sensing system 20. A cradle 70 having an open upper portion 74 attaches to the conduit 24 with a sleeve member 72 in the access hole 26.

As shown in FIG. 2, the sensing system 20 includes a plurality of sensor probes 50 in spaced apart relationship. As shown in FIG. 7, each of the probes 50 includes a housing 52 having a top portion 54 and bottom portion 56 with an electronic sensor 58 extending substantially vertically in the housing. The probes are connected by cable 60, as shown in FIG. 2 or each probe 50 may have a separate cable leading to a processor or controller. As shown in FIG. 7, the sensor 58 includes a microloop coil 62 mounted on a planar strip 64 and circuitry box 66 for sensing the change in impedance when a vehicle passes over the probe's position. Rebar or other ferro-magnetic material already present in the road does not normally affect the sensitivity or accuracy of the sensor 58. It can be appreciated that other types of below ground vehicle sensing devices that accurately detect the presence of a vehicle and that do not need to be placed into or through pavement may be utilized with the present invention. When the probe 50 senses the presence of a vehicle, a signal is sent to a microprocessor or other control system for processing, such as traffic light control or other traffic analysis. To function properly, the probes 50 should be aligned in a substantially vertical orientation, as the efficiency is decreased when tilted substantially away from vertical or the preferred design position. The probe housing 52 may include flanges or other structure to aid in stabilizing the sensor 58 in proper orientation. It has been found that the performance of the sensors 58 is substantially unaffected when the sensor 58 is within 10° of vertical. In addition, satisfactory performance has been achieved when the sensor 58 is within 45° of vertical.

In a first embodiment shown in FIG. 2, the probes 50 are housed in probe carrier support sections 32 forming extended protective supporting structure 30 which protects, spaces and aligns the probes 50. Each of the sections 32 includes a rounded outer wall 34 which preferably inserts into the conduit 24. As shown in FIGS. 3 and 5, the sections 32 each have a rounded outer wall 34 with an open top portion 36. A frame portion 38 includes probe mounting holes 40 for receiving and aligning the probes 50, as shown on FIG. 2. The frame 38 also includes a clip 44 which mounts at one end of the section 32. The frame 38 or lower portion of the support section 32 may be weighted to stabilize the section and hold the probe 50 in a substantially vertical stable position. As shown in FIG. 4, the clip 44 attaches to the next adjacent section 32 to hold the sections in a connected arrangement and angularly aligned. The clip 44 includes a retaining section 46 which engages a clip slot 42 formed in the opposite end of the adjacent section frame 38 and resists removal once inserted. In a preferred embodiment, the clip 44 is a corrosion resistant material, such as 300 series stainless steel or plastic. It can be appreciated that a plurality of the sections 32 may be connected to form an extended support 30 housing a plurality of probes 50 in spaced apart relationship. It can be appreciated that the frame 38 includes two or more probe mounting holes 40 in spaced apart relationship so that the spacing of the probes may be varied to accommodate probe spacing specifications.

It can be appreciated that to ease insertion of the extended support section 30, a conical rounded nose piece 78 may be affixed to the first support section 32 to aid in clearing any irregularities in the conduit 24, such as joints or bends or to displace debris collected within the bore of conduit 24. To ease removal, a retrieval cord or line 76 is attached to the first section 32 so that the sections may be pulled back for retrieval and removal.

Figure 8:
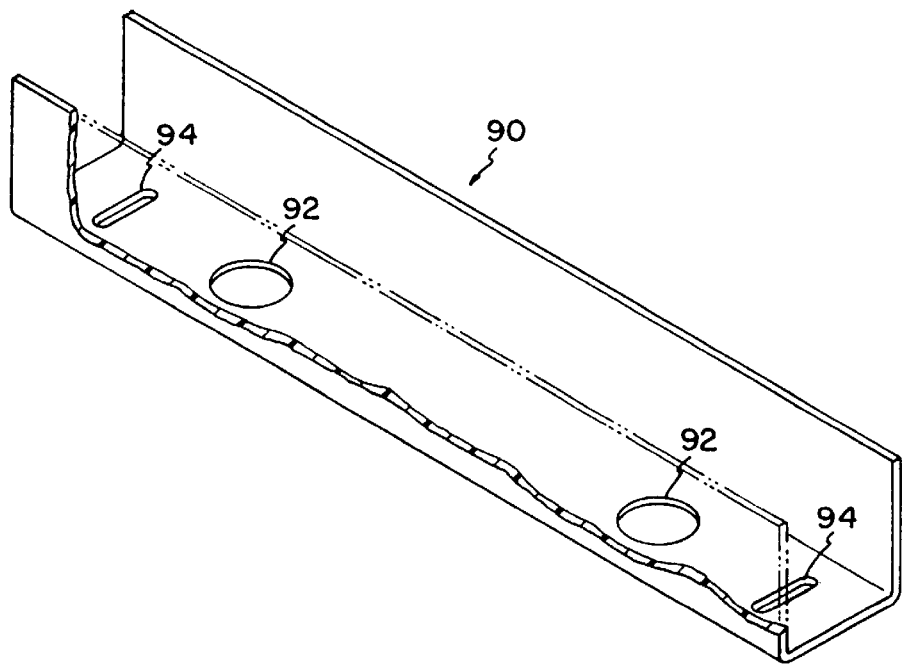
FIG. 8 shows a perspective view of a second embodiment of a probe carrier support section according to the principles of the present invention.

Referring to FIG. 8, there is shown a second embodiment of a probe carrier support section 90. The support section 90 includes a planar bottom portion and sides extending upward therefrom. Probe mounting orifices 92 are formed in the bottom portion and spaced apart for receiving sensor probes 58. Slots 94 are formed near the end of the support section 90. It can be appreciated that the sections 90 accommodate a clip member 44, shown in FIG. 4, to attach to sections in an end-to-end relationship. It can be appreciated that the sections 90 insert within the conduit and support the probes 50 in a spaced apart relationship and substantially vertically aligning the sensors 58.

Figure 9:
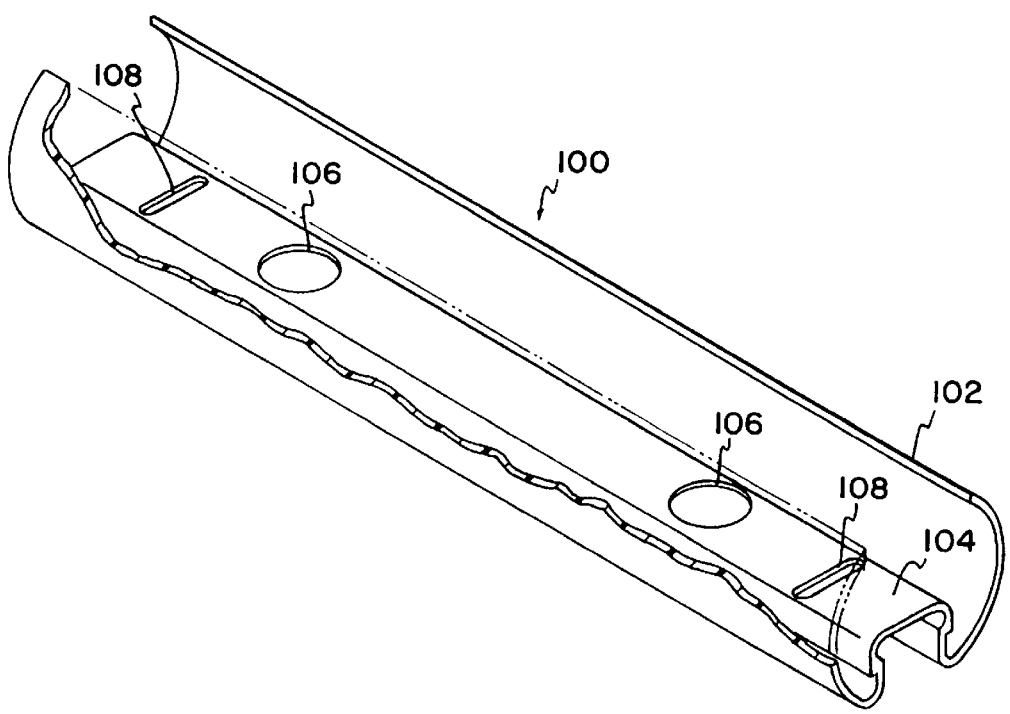
FIG. 9 shows a perspective view of a third embodiment of a probe carrier support section according to the principles of the present invention.

Referring to FIG. 9, there is shown a third embodiment of a probe carrier support section 100. The support section 100 includes an outer portion 102 and a mounting potion 104. As shown in FIG. 9, the outer portion 102 and mounting portion 104 are integrally formed of a single element but may be attached in other ways as well. The outer portion 102 forms an open top for receiving probes 58 mounting in orifices 106 in the upper portion of the mounting portion 104. It can be appreciated that the mounting portion 104 accommodates a clip 44, shown in FIG. 4, for connecting the sections 100 in an end-to-end relationship. The clips 44 attach to the slots 108 in adjacent sections.

Figure 10:
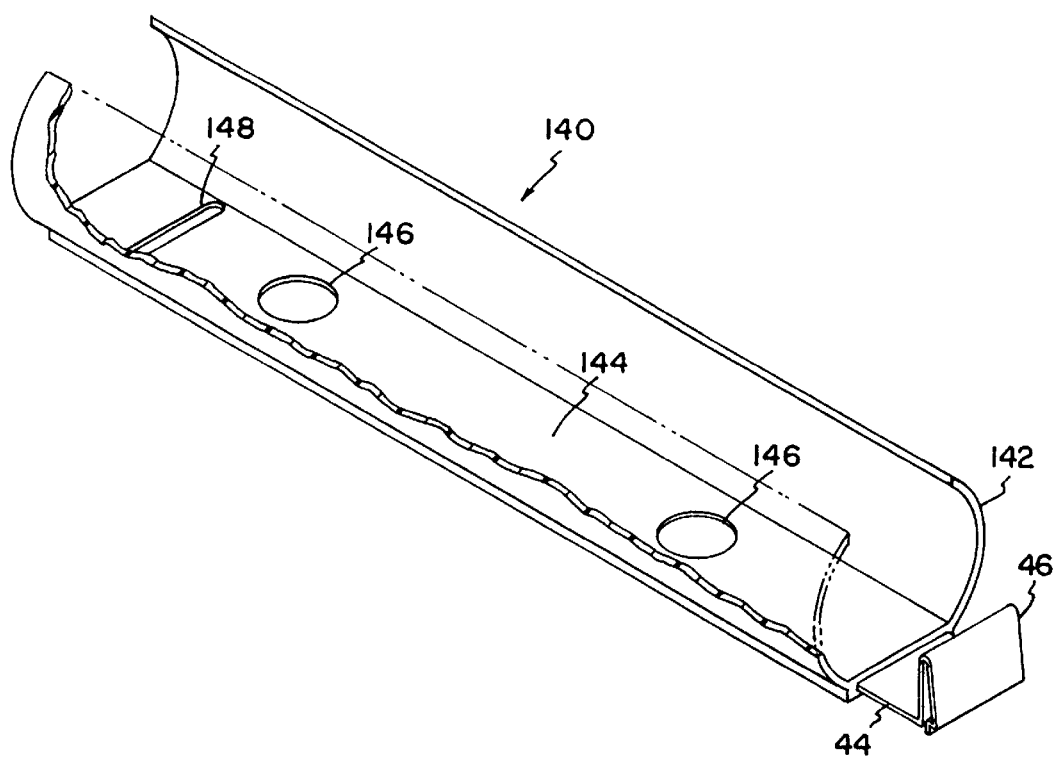
FIG. 10 shows a perspective view of a fourth embodiment of a probe carrier support section with a mounting clip attached according to the principles of the present invention.

Referring now to FIG. 10, there is shown a fourth embodiment of a probe carrier support section 140. The support section 140 includes an arcing outer portion 142 and a mounting potion 144 having slots 148 formed therein. The outer portion 142 forms an open top for receiving probes 58 mounting in orifices 146 in the upper portion of the mounting portion 144. It can be appreciated that the mounting portion 144 accommodates the clip 44 shown in FIG. 4, for connecting the sections 140 in an end-to-end relationship. The clips 44 attach to the slots 148 in adjacent sections with the clips 44 being inverted from the position shown in FIG. 4.

Referring now to FIGS. 1 and 2, it can be appreciated that with the present invention, assembly and placement of the probes and the vehicle sensing system 20 is simplified and easily accomplished. Once the bore is formed and a conduit 24, if used, is inserted, the support structure 30 and the probes 50 may be placed. To begin insertion, the first section 32 is placed into the access hole 26 and placed into the opening 74 of the cradle member 70. The cradle member 70 is connected via the sleeve member 72 to the remainder of the conduit 24. The first sensor probe 50 is placed into a mounting hole 40 in the frame 38 and the associated wiring is fed backward toward the open end. In addition, the retrieval line 76 is connected to the first section and extended backward. When this step has been completed, the section 32 is pushed forward into the conduit until sufficient room is made in the opening 74 of the cradle 70 with the second section 32 placed so that the clip member 44 engages the slot 42 in the frame 38 of the first section 32. The string of sensors is placed through the open top 36 of the second section 32 and the retrieval line 76 is also placed over the openings in the section 32. If spacing dictates that a probe 50 should be placed in a section 32, the probe 50 is inserted into one of the mounting holes 40. When this step has been completed, the connected sections 32 are pushed forward into the conduit 24. This process is repeated until sufficient sections 32 have been placed into the conduit 24 so that the sensor probes 50 are aligned with their predetermined sensing positions beneath the vehicle travel surface 22.

As shown in FIG. 6, a cradle clip 80 is placed onto the opening 74 of the cradle member 70 and over the last section 32. The cradle clip 80 includes a support section frame engaging portion 82 which fits over the frame 38 of the support section 32. The cradle clip 80 also includes a support section wall engaging portion 84 which extends over the opening 36 and the curved wall 34. A cradle engaging portion 86 attaches to the edge of the cradle opening 74. The clip 80 secures the last section 32 into place and retains the entire support structure 30 in proper alignment and positioned at the proper distance into the conduit 24. The wiring 60 is then fed to the proper processors for data analysis, which may either be placed at the hand hole 26 or placed remotely therefrom.

Referring now to FIG. 11, there is shown a second embodiment of vehicle sensing system 120 similar to the system 20 shown in FIG. 1. The system 120 includes sensor probes 50 mounted in support sections 32 within a conduit 24. However, intermediate connector sections 122 may be inserted in place of the selected support sections 32. The connector sections 120 may be solidly attached to the sections 32 or may include a hinge 124 for connecting the connector sections 122 to the support sections 32. It can be appreciated that connector sections 122 may be reduced weight and low cost shafts or struts. The connector sections 122 are typically clipped or otherwise detachably connected to the support sections 32 in such a manner that the distance between the sections 32 and the relative alignment of the sections 32 is maintained. In this manner, the connector sections 122 may be utilized in conjunction with the support sections to provide a low cost, light weight and simple to install and remove system 120.

Referring now to FIG. 12, there is shown another embodiment of the vehicle sensing system 130. The vehicle sensing system 130 includes support sections 32 inserted into conduit 24. A single access hole 26 may be utilized for installation of the system 130. However, similar to the system 120 shown in FIG. 10, along lengths wherein sensors 50 are not supported, connector material 132 may be utilized. The system 130 utilizes the connector material 132 which clips or otherwise attaches to the support sections 32. The connector material 132 may be substantially stiff material which possesses some flexibility such that it may be coiled or rolled. However, when inserted into the conduit 24, the connector material 132 maintains the distance between the support sections 32 and the relative angular alignment. In this manner, support sections 32 may be clipped or otherwise attached to the connector material 132 at predetermined locations along the material 132 or supporting sensors 50.

Although the embodiments shown in FIGS. 1, 11 and 12 make reference to utilization of support sections 32, it can be appreciated that the support sections 90, 100 and 140, as shown in FIGS. 8, 9 and 10 may also be utilized.

It can be appreciated that with the present invention, the method for installation requires placement of only a single support section 32, 90, 100 or 140 at a time. The support structure 30 does not need to be pulled through and requires only a single opening 26 at one side of the vehicle travel surface 22 rather than openings at each end for pulling electronics and other structures through the hole. Moreover, it can be appreciated that the structure provides a light weight support structure 30 which can be easily inserted. Each of the sections provide for no relative angular movement between adjacent sections 32 so that all of the probes 50 may be substantially vertically aligned for improved performance.

Should maintenance be required, it can be appreciated that the structure can be pulled outward through the access hole 26 by removing one section 32 at a time and pulling the sections back with the retrieval line 76 or by taking the end most section 32 and pulling it into the opening and unclipping the end most section 32 from the next adjacent section 32. It can also be appreciated that the distance to the endmost sensor may be measured from the access hole 26 and that sufficient support sections 32 may be inserted until the end probe 50 is placed at the proper position beneath the pavement. The distance back from which a sensor probe 50 needs to be placed from the first section may be marked on the retrieval line 76 or on the wiring and a probe inserted into the sections 32 proximate the predetermined position. In this manner, easy installation is provided for following placement of the first endmost probe 50.

It can also be appreciated that the present structure provides for magneto-inductive sensing which reduces the number of false readings and provides for a more accurate reading of even smaller vehicles. In addition, since the system is substantially lightweight and low cost, the probes may be placed at different positions within each lane under the pavement for covering substantially the entire width of the pavement, if so desired. It can also be appreciated that since the system senses vehicle induced localized changes in the Earth's magnetic field, the probes 50 may be placed at a lower depth so that the pavement may be left intact, thereby reducing the number of lanes which must be closed, as well as the length of time that traffic flows is interrupted during initial installation of the system 20. Moreover, service or maintenance typically does not require any lane closures. This provides for substantial labor savings and decreased traffic interruption through the location where the presence of vehicles is being sensed. The present invention also provides for easy installation or repair of the vehicle sensing system 20 after the pavement has been laid without loss of efficiency.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for detecting vehicles on a vehicle travel surface, comprising:
    (a) a conduit for installation under the vehicle travel surface; and
    (b) a support section adapted for insertion and sliding within the conduit, said support section arranged to carry a sensor probe at a fixed orientation relative to the support section to a predetermined position within the conduit, a second support section connected to said support section in an end to end manner by an attachment structure, the support sections adapted for rotation together within the conduit even after complete installation to permit adjustment of the orientation of the sensor probe with respect to the vehicle surface, such that the support section can be accessed without damage to the vehicle travel surface.

2. A system according to claim 1, wherein each support section is separable from each adjacent support section.

3. A system according to claim 1, further comprising at least one clip for detachably connecting adjacent support sections to each other.

4. A system according to claim 1, wherein the system further comprises a sensor probe within the support section.

5. A system according to claim 4, wherein said sensor probe is wired to a remote indicator.

6. A system according to claim 1, further comprising an insertion portion including an access hole connected to the conduit.

7. A system according to claim 6, further comprising a cradle connected to a first end of the conduit within the access hole.

8. A system according to claim 1, wherein the system includes a support section with a frustro-conical end portion.

9. A system according to claim 1, wherein the system includes a support section that is weighted to orient that support section.

10. A system according to claim 1, wherein the conduit is installed beneath or within the vehicle travel surface.

11. A system according to claim 10, wherein the conduit is placed between 40 and 60 centimeters below the vehicle travel surface.

12. A system according to claim 1, further comprising spacers for insertion intermediate said support section and an adjacent support section for connecting the selected support sections at a fixed position relative to each other.

13. A system according to claim 1, wherein each support section has a plurality of sensor probe mounting locations.

14. A support section for a probe, comprising:
    (a) outer walls;
    (b) a receiving portion for receiving the probe; wherein the receiving portion is configured for maintaining the probe in a fixed position relative to the support section;
    (c) a mounting portion; and
    (d) an attachment structure adjacent an end of the support section, the attachment structure being attachable to a mounting portion of an adjacent support section and, when so attached, both support sections may be rotated together within a conduit to permit adjustment of the orientation of the probe even after complete installation without damage to the vehicle travel surface, wherein both support sections are adapted for insertion and sliding within the conduit.

15. The support section according to claim 14, wherein the mounting portion is a tab, and the attachment structure is a slot for receiving the tab.

16. A support section according to claim 14, wherein the receiving portion is configured for aligning the probes toward an open top portion.

17. A method for installing an underground vehicle sensing system for sensing the presence of a vehicle on a vehicle travel surface, comprising the steps of:
    (a) forming an access hole and providing a conduit extending from the access hole substantially horizontally below the vehicle travel surface;
    (b) inserting a support section into the access hole and mounting a sensor probe in the support section;
    (c) moving the support section and the sensor probe into the conduit so that the access hole may receive another support section;

(d) inserting the another support section into the access hole and attaching it to a previously inserted support section;

(e) mounting a sensor probe in the another support section;

(f) moving the support sections into the conduit until said sensors are located at predetermined locations below the vehicle travel surface; and (g) rotating the support sections as a unit to provide the sensor probes at a desired orientation.

18. A method according to claim 17, wherein the access hole is formed remote from the vehicle travel surface.

19. A method according to claim 17, wherein the support sections are placed in a cradle having an open top prior to moving into the bore.

* * * * *

UNITED STATES PATENT AND TRADEMARK OFFICE
CERTIFICATE OF CORRECTION

PATENT NO. : 5,850,192
DATED : December 15, 1998
INVENTOR(S) : Frederick J. Turk, Claude E. Cybulski and Earl B. Hoekman It is certified that error appears in the above-indentified patent and that said Letters Patent is hereby corrected as shown below:

Title Page [56] References Cited under "Foreign Patent Documents" please delete "2437797 A 2/1976 United Kingdom" and insert --2437797 A 2/1976 Germany--.

Signed and Sealed this

Eighteenth Day of April, 2000

Attest:

Q. TODD DICKINSON

Attesting Officer

Director of Patents and Trademarks